United States Patent
Kwon et al.

(10) Patent No.: US 12,417,001 B2
(45) Date of Patent: Sep. 16, 2025

(54) SENSOR DEVICE PACKAGE AND IMAGE DISPLAY DEVICE INCLUDING THE SAME

(71) Applicant: DONGWOO FINE-CHEM CO., LTD., Jeollabuk-do (KR)

(72) Inventors: Do Hyoung Kwon, Jeollabuk-do (KR); Yoon Ho Huh, Jeollabuk-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 0 days.

(21) Appl. No.: 18/925,196

(22) Filed: Oct. 24, 2024

(65) Prior Publication Data
US 2025/0138683 A1  May 1, 2025

(30) Foreign Application Priority Data
Oct. 25, 2023 (KR) .................. 10-2023-0143425

(51) Int. Cl.
*G06F 3/044* (2006.01)
(52) U.S. Cl.
CPC .................. *G06F 3/0445* (2019.05)
(58) Field of Classification Search
CPC .. G06F 3/0443; G06F 3/0412; G06F 3/04164; G06F 3/0446; G06F 3/0445
See application file for complete search history.

(56) References Cited

U.S. PATENT DOCUMENTS

| | | | |
|---|---|---|---|
| 2022/0216587 A1* | 7/2022 | Choi | H01Q 1/38 |
| 2023/0168756 A1* | 6/2023 | Lee | H01Q 1/48 |
| | | | 345/174 |
| 2024/0393908 A1* | 11/2024 | Choi | G06F 3/04164 |

FOREIGN PATENT DOCUMENTS

| | | |
|---|---|---|
| KR | 10-2003-0095557 A | 12/2003 |
| KR | 10-2011-0101026 A | 9/2011 |
| KR | 10-2014-0092366 A | 7/2014 |
| WO | WO 2017/069114 A1 | 4/2017 |

OTHER PUBLICATIONS

Office action issued on Aug. 5, 2025 from Japan Intellectual Property Office in a counterpart Japanese Patent Application No. 2024-188293 all the cited references are listed in this IDS.) (English translation is also submitted herewith.).

* cited by examiner

*Primary Examiner* — Deeprose Subedi
(74) *Attorney, Agent, or Firm* — The PL Law Group, PLLC

(57) ABSTRACT

A sensor device package includes a sensor device including touch sensing electrodes and an antenna unit, and a circuit board bonded to the sensor device. The circuit board includes a core layer including a first surface and a second surface which face each other, a first conductive layer including first touch sensor signal lines and a first antenna signal line distributed at the same level on the first surface, a second conductive layer including second touch sensor signal lines and a second antenna signal line distributed at the same level on the second surface, an antenna via structure which penetrates the core layer to connect the first antenna signal line and the second antenna signal line with each other, and a touch sensor via structure which penetrates the core layer to connect the first touch sensor signal lines and the second touch sensor signal lines to each other, respectively.

18 Claims, 6 Drawing Sheets

SENSOR DEVICE PACKAGE AND IMAGE DISPLAY DEVICE INCLUDING THE SAME

CROSS-REFERENCE TO RELATED APPLICATION AND CLAIM OF PRIORITY

This application claims the benefit under 35 USC § 119 of Korean Patent Application No. 10-2023-0143425 filed on Oct. 25, 2023, in the Korean Intellectual Property Office, the entire disclosure of which is incorporated herein by reference for all purposes.

BACKGROUND

1. Field of the Invention

The present invention relates to a sensor device package and an image display device including the same, and more specifically, to a sensor device package which includes a sensor device and a circuit board, and an image display device including the sensor device package.

2. Description of the Related Art

Recently, according to development of the information-oriented society, wireless communication techniques such as Wi-Fi, Bluetooth, and the like are implemented, for example, in a form of smartphones by combining with image display devices. In this case, an antenna may be coupled to the image display device to perform a communication function.

Recently, with mobile communication techniques becoming more advanced, an antenna for performing high frequency or ultra-high frequency communication corresponding to 3G to 5G or higher, for example, may be coupled to the image display device.

Meanwhile, electronic devices, in which a touch panel or a touch sensor as an input device for allowing a user to select instructions displayed on a screen by his or her finger or an object such as a touch pen and input his or her command is coupled with the image display device to implement an image display function and an information input function together, have been developed. For example, as disclosed in Korean Patent Laid-Open Publication No. 2014-0092366, a touch screen panel, in which a touch sensor is coupled to various image display devices, has been developed.

When the antenna structure is disposed together with the touch sensor, signal interference between the antenna and the touch sensing electrode may occur. In addition, mutual signal interference may also occur in a circuit structure for performing power supply to the antenna structure and the touch sensor, respectively.

For example, Korean Patent Laid-Open Publication No. 2003-0095557 discloses an antenna structure built into a portable terminal, but it fails to consider consistency with other electrical devices such as a touch sensor.

SUMMARY

An object of the present invention is to provide a sensor device package having improved reliability and efficiency of signal transmission and reception.

Another object of the present invention is to provide an image display device including the sensor device package having improved reliability and efficiency of signal transmission and reception.

To achieve the above objects, the following technical solutions are adopted in the present invention.

1. A sensor device package including: a sensor device including touch sensing electrodes and an antenna unit; and a circuit board which is bonded to the sensor device, wherein the circuit board includes: a core layer including a first surface and a second surface which face each other; a first conductive layer including first touch sensor signal lines and a first antenna signal line which are distributed at the same level on the first surface of the core layer; a second conductive layer including second touch sensor signal lines and a second antenna signal line which are distributed at the same level on the second surface of the core layer; an antenna via structure which penetrates the core layer to connect the first antenna signal line and the second antenna signal line with each other; and a touch sensor via structure which penetrates the core layer to connect each of the first touch sensor signal lines and the second touch sensor signal lines with each other.

2. The sensor device package according to the above 1, wherein the sensor device further includes touch sensor pads electrically connected with the touch sensing electrodes and an antenna pad electrically connected with the antenna unit, wherein the first touch sensor signal lines of the circuit board are bonded to the touch sensor pads respectively, and the first antenna signal line of the circuit board is bonded to the antenna pad.

3. The sensor device package according to the above 2, wherein the touch sensor pads and the antenna pad are arranged at one end of the sensor device to form a single pad row.

4. The sensor device package according to the above 3, wherein the sensor device further includes a blocking pad which is included in the single pad row and inserted between adjacent touch sensor pads of the touch sensor pads, or a guard pad disposed at an end of the single pad row.

5. The sensor device package according to the above 4, wherein the sensor device further includes: traces which connect the touch sensing electrodes and the touch sensor pads with each other; and a blocking line which extends from the blocking pad between adjacent traces of the traces.

6. The sensor device package according to the above 4, wherein the sensor device further includes a guard line of a loop shape, which extends from the guard pad and surrounds the touch sensing electrodes.

7. The sensor device package according to the above 3, further including one anisotropic conductive film which bonds the single pad row and the first conductive layer of the circuit board.

8. The sensor device package according to the above 2, wherein the antenna unit includes a radiator and a transmission line which extends from the radiator to be connected to the antenna pad.

9. The sensor device package according to the above 8, wherein a plurality of antenna units are arranged in a row direction, and the antenna pads are independently connected to each of the antenna units.

10. The sensor device package according to the above 9, wherein the transmission lines connected to each of the plurality of antenna units have a bent line shape and have the same length.

11. The sensor device package according to the above 9, wherein at least one touch sensor pad of the touch sensor pads is arranged between the antenna pads connected to adjacent antenna units of the antenna units.

12. The sensor device package according to the above 1, further including: a touch sensor driving circuit/touch sensor connection structure electrically connected with the second touch sensor signal lines on the second surface of the core layer; and an antenna driving circuit/antenna connection structure electrically connected with the second antenna signal line on the second surface of the core layer.

13. The sensor device package according to the above 12, wherein the antenna driving circuit/antenna connection structure includes an antenna driving integrated circuit chip or an antenna connector, and the touch sensor driving circuit/touch sensor connection structure includes a touch sensor driving integrated circuit chip or a touch sensor connector.

14. The sensor device package according to the above 1, wherein the circuit board further includes a mid-ground layer disposed between the first conductive layer and the second conductive layer in the core layer.

15. The sensor device package according to the above 14, wherein the antenna via structure and the touch sensor via structure are electrically separated from the mid-ground layer and penetrate the mid-ground layer.

16. The sensor device package according to the above 1, wherein the sensor device further includes a substrate layer, wherein the touch sensing electrodes and the antenna unit are arranged together at the same level on the upper surface of the substrate layer.

17. The sensor device package according to the above 16, wherein the substrate layer includes an active area where the touch sensing electrodes are distributed and a peripheral area surrounding the active area, wherein the antenna unit is partially disposed on the active area.

According to embodiments of the present invention, the radiator and the sensing electrodes may be disposed together in the active area of the sensor device, thereby improving space efficiency. In addition, the touch sensor pads and the antenna pads are disposed together in the bonding area, such that power supply/signal transmission may be performed through one circuit board.

In exemplary embodiments, the circuit board has a multilayer structure including a first conductive layer and a second conductive layer, and each of the first conductive layer and the second conductive layer may include an antenna signal line and a touch signal line. Through the antenna via structure and the touch via structure which connect the first conductive layer and the second conductive layer with each other, power supply reliability and power supply efficiency to the antenna pad and the touch sensor pad may be improved through the single circuit board.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
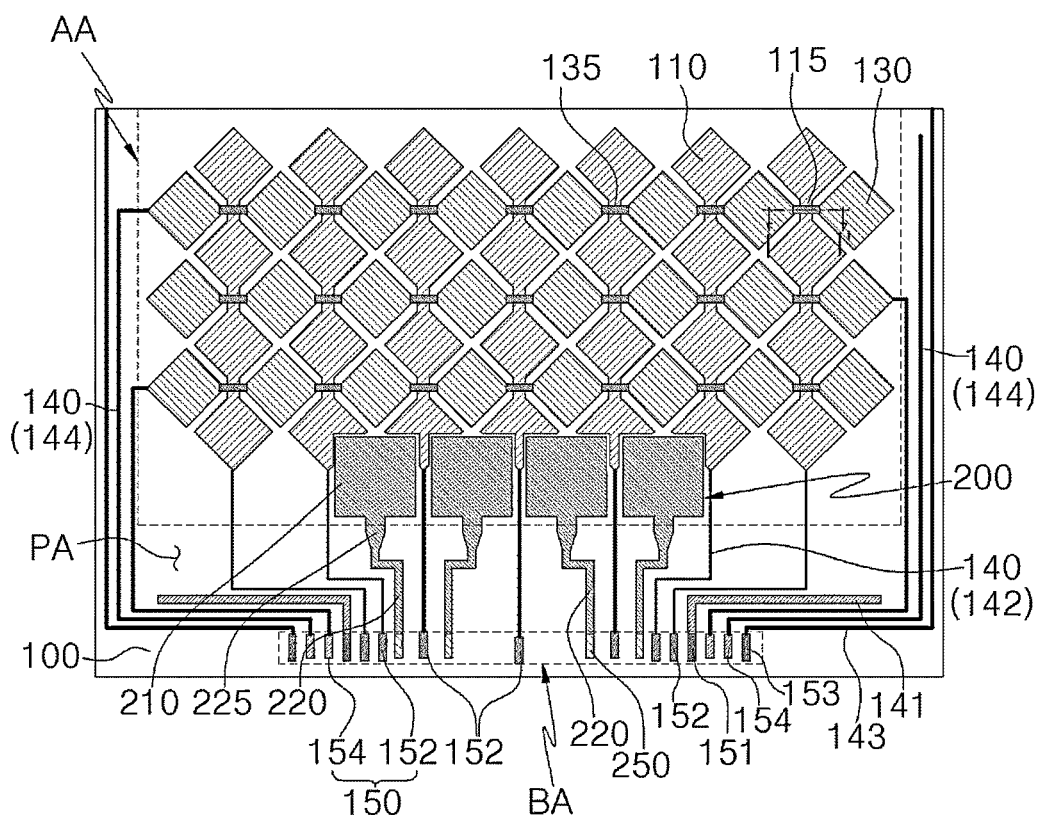
FIG. 1 is a schematic plan view illustrating a sensor device according to exemplary embodiments.

Embodiments of the present invention provide a sensor device package which includes a sensor device including an antenna unit and sensing electrodes, and a circuit board. In addition, an image display device including the sensor device package is provided.

The antenna unit may be, for example, a microstrip patch antenna manufactured in the form of a transparent film. The sensor device including the antenna unit may be applied to, for example, a communication device for high frequency or ultra-high frequency (e.g., 3G, 4G, 5G or higher) mobile communication. However, the use of the sensor device is not limited only to the image display device, and the sensor device may be applied to various structures such as a vehicle, a home appliance, a building and the like.

Hereinafter, preferred embodiments of the present invention will be described in detail with reference to the accompanying drawings. However, since the drawings attached to the present disclosure are only given for illustrating one of several preferred embodiments of present invention to easily understand the technical spirit of the present invention with the above-described invention, it should not be construed as limited to such a description illustrated in the drawings.

The terms "first," "second," "one surface," "the other surface," "one end," "the other end," "upper side," "lower side," "upper portion," "lower portion," "column direction," "row direction," and the like as used herein do not limit the absolute position or order, but are used in a relative sense to distinguish different components or portions.

The term "row direction" as used herein may correspond to a width direction parallel to an active surface or display surface of a sensor device or an image display device. The term "column direction" may be a length direction parallel to the active surface or the display surface, and may be a direction perpendicular to the row direction.

Figure 2:
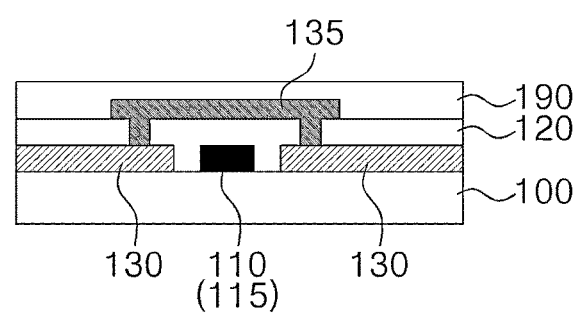
FIG. 2 is a schematic cross-sectional view illustrating a touch sensing electrode structure of the sensor device according to exemplary embodiments.

FIG. 1 is a schematic plan view illustrating a sensor device according to exemplary embodiments. FIG. 2 is a schematic cross-sectional view illustrating a touch sensing electrode structure of the sensor device according to exemplary embodiments. FIG. 2 is a cross-sectional view taken on line I-I' of FIG. 1 in a thickness direction.

Referring to FIGS. 1 and 2, the sensor device may include a substrate layer 100, touch sensing electrodes 110 and 130 (hereinafter, abbreviated as sensing electrodes) and an antenna unit 200 which are disposed on the substrate layer 100.

The substrate layer 100 may include a support layer, an interlayer insulation layer or a film type substrate for forming the sensing electrodes 110 and 130 and the antenna unit 200. For example, the substrate layer 100 may also be provided as a dielectric layer of the antenna unit 200.

For example, the substrate layer 100 may include a transparent resin film including a polyester resin such as polyethylene terephthalate, polyethylene isophthalate, polyethylene naphthalate, polybutylene terephthalate, etc.; a cellulose resin such as diacetyl cellulose, triacetyl cellulose, etc.; a polycarbonate resin; an acrylic resin such as polymethyl (meth)acrylate, polyethyl (meth)acrylate, etc.; a styrene resin such as polystyrene, acrylonitrile-styrene copolymer, etc.; a polyolefin resin such as polyethylene, polypropylene, cyclic polyolefin or polyolefin having a norbornene structure, ethylene-propylene copolymer, etc.; a vinyl chloride resin; an amide resin such as nylon, aromatic polyamide; an imide resin; a polyether sulfonic resin; a sulfonic resin; a polyether ether ketone resin; a polyphenylene sulfide resin; a vinylalcohol resin; a vinylidene chloride resin; a vinylbutyral resin; an allylate resin; a polyoxymethylene resin; an epoxy resin; a urethane or acrylic urethane resin, a silicone resin and the like. These may be used alone or in combination of two or more thereof.

In some embodiments, the substrate layer 100 may include an adhesive film, such as an optically clear adhesive (OCA), an optically clear resin (OCR) and the like.

In some embodiments, the substrate layer 100 may include an inorganic insulation material such as a silicon oxide, silicon nitride, silicon oxynitride, glass and the like.

In one embodiment, the substrate layer 100 may be provided as a substantial single layer.

In one embodiment, the substrate layers 100 may each include a multilayer structure of two or more layers. For example, the substrate layer 100 may include a lower substrate and a dielectric layer, and may include an adhesive layer between the lower substrate and the dielectric layer.

An impedance or inductance for the antenna unit 200 is formed by the substrate layer 100, thus to adjust a frequency band which can be driven or sensed by the antenna unit 200. In some embodiments, the dielectric constant of the substrate layer 100 may be adjusted to a range of about 1.5 to 12. When the dielectric constant exceeds about 12, a driving frequency is excessively reduced, such that driving (of the antenna) in a high frequency band may not be implemented.

In one embodiment, a ground layer (not shown) may be disposed under a lower surface of the substrate layer 100.

In one embodiment, a conductive member of an image display device or display panel to which the sensor device is applied may be provided as the ground layer.

For example, the conductive member may include electrodes or wirings such as a gate electrode, source/drain electrodes, a pixel electrode, a common electrode, a data line, a scan line, and the like included in a thin film transistor (TFT) array panel.

In one embodiment, a metallic member such as a stainless steel (SUS) plate, a sensor member such as a digitizer, a heat radiation sheet, etc., disposed on a back portion of the image display device may be provided as the ground layer.

The substrate layer 100 may include, on an upper surface thereof, an active area AA and a peripheral area PA around the active area AA. The sensing electrodes 110 and 130 and the antenna unit 200 may be arranged on the active area AA of the substrate layer 100.

The sensing electrodes 110 and 130 may be disposed on the upper surface of the substrate layer 100 in the active area AA portion. When a touch is input form a user into the active area AA, a change in electrostatic capacity may occur by the sensing electrodes 110 and 130. Accordingly, a physical touch may be converted into an electrical signal to perform a predetermined sensing function.

The sensing electrodes 110 and 130 may include first sensing electrodes 110 and second sensing electrodes 130. The first sensing electrodes 110 and the second sensing electrodes 130 may be arranged in a direction intersecting each other. The first sensing electrodes 110 and the second sensing electrodes 130 may be positioned in the same layer or at the same level as each other on the upper surface of the substrate layer 100.

For example, the first sensing electrodes 110 may be arranged in a column direction (e.g., a Y direction). The first sensing electrodes 110 may be connected with each other in the column direction through a mergence part 115. The mergence part 115 may be integrally connected with the first sensing electrodes 110 to be provided as a substantial single member.

When a plurality of first sensing electrodes 110 are connected by the mergence parts 115, sensing channel columns extending in the column direction may be defined. In addition, a plurality of the sensing channel columns may be arranged in a row direction (e.g., an X direction).

The second sensing electrodes 130 may be arranged in the row direction. Each of the second sensing electrodes 130 may have an island pattern shape spaced apart from each other. The second sensing electrodes 130 adjacent to each other in the row direction may be electrically connected with each other by a bridge electrode 135.

For example, a pair of second sensing electrodes 130, which are adjacent to each other with the mergence part 115 included in the sensing channel columns interposed therebetween, may be electrically connected with each other by the bridge electrode 135. Accordingly, a plurality of sensing channel rows may be defined by the second sensing electrodes 130 and the bridge electrodes 135 connected in the row direction. In addition, the plurality of the sensing channel rows may be arranged in the column direction.

As shown in FIG. 2, an interlayer insulation layer 120 which covers the first and second sensing electrodes 110 and 130 is formed, and the bridge electrode 135 may penetrate the interlayer insulation layer 120 to connect the adjacent second sensing electrodes 130.

In some embodiments, a protective layer 190 which covers the bridge electrode 135 may be formed on the interlayer insulation layer 120. The interlayer insulation layer 120 and the protective layer 190 include the above-described resin material or inorganic insulation material, and may cover the sensing electrodes 110 and 130 and the antenna units 200 together. The interlayer insulation layer 120 and the protective layer 190 may be removed in a bonding area BA, such that the pads are exposed to an outside.

In FIG. 1, it is illustrated that each of the sensing electrodes 110 and 130 has a rhombus pattern shape, but the shapes of the sensing electrodes 110 and 130 may be appropriately changed in consideration of the pattern density, consistency with optical characteristics of the image display device, arrangement of the antenna units 200 and the like. For example, the sensing electrodes 110 and 130 may be formed to have a wavy edge.

In FIG. 1, it is illustrated that column-directional sensing electrodes are integrally connected with each other by the mergence parts, and row-directional sensing electrodes are connected with each other by the bridge electrodes, however, the column direction and the row direction are used relatively to refer to two other intersecting directions, and it is not intended to limit them to a specific direction.

In addition, the number of sensing channel rows and sensing channel columns shown in FIG. 1, and the number of sensing electrodes included therein are only partially shown for the convenience of description, and may be expanded according to an area of the active area AA.

An area of the upper surface of the substrate layer 100 except for the active area AA may be defined as a peripheral area PA. The peripheral area PA may be defined as an area which at least partially surrounds the periphery of the active area AA. The peripheral area PA may include a bezel area of the image display device, and may include the bonding area BA in which the pads are arranged. The active area AA may be overlapped with a display area of the image display device.

The sensor device may further include traces 140 and touch sensor pads 150.

The traces 140 may be branched from each sensing channel row and sensing channel column to extend on the peripheral area PA. The traces 140 may include first traces 142 which are branched from the sensing channel columns and second traces 144 which are branched from the sensing channel rows. The traces 140 may include a conductive material and/or lamination structure substantially the same as or similar to the sensing electrodes 110 and 130.

In some embodiments, the second traces 144 may be arranged in accordance with a double-routing manner. The second traces 144 may be alternately distributed on both sides of the peripheral area PA in the row direction.

For example, the second traces 144 may be arranged alternately in the column direction on the both sides. A second trace 144 may be branched from an end on one side of a sensing channel row among the sensing channel rows, and another second trace 144 may be branched from an end on a side opposite the one side of another sensing channel row adjacent to the sensing channel row.

By the above-described double-routing arrangement, a sufficient active area AA area may be secured while reducing the area of the peripheral area PA on both sides. In addition, by reducing a deviation in the length of the second traces 144, resistance/sensing uniformities may be improved. Further, by distributing the conductive lines on both sides, a stress due to folding of the sensor device may be uniformly dispersed.

In some embodiments, the first traces 142 may be branched from one end of each of the sensing channel columns adjacent to the bonding area BA. Accordingly, the length of the first traces 142 may be decreased, thereby increasing sensing/signal transmission speeds.

In one embodiment, some of the first traces 142 may be branched from the other end of the sensing channel column and extend to the bonding area BA.

As shown in FIGS. 1 and 2, the sensing electrodes 110 and 130 may be arranged in accordance with mutual capacitance manner.

In some embodiments, the sensing electrodes 110 and 130 may also be arranged in accordance with a self-capacitance manner. In this case, each of the sensing electrodes 110 and 130 may have an independent island pattern shape, and the traces 140 may be branched from each of sensing electrodes 110 and 130 having the island pattern shape. In addition, the mergence part 115 and the bridge electrode 135 may be omitted.

The traces 140 may extend on the peripheral area PA and may be collected in the bonding area BA. Touch sensor pads 150 which are connected to distal ends of the traces 140 may be disposed within the bonding area BA.

The touch sensor pads 150 may include first touch sensor pads 152 electrically connected with each of the sensing channel columns through the first traces 142 and second touch sensor pads 154 electrically connected with each of the sensing channel rows through the second traces 144.

In some embodiments, a blocking pad 151 and a guard pad 153 may be arranged adjacent to the touch sensor pads 150. The blocking pad 151 and the guard pad 153 may not be electrically or physically connected with the traces 140. The blocking pad 151 and the guard pad 153 are not connected with the touch sensing electrodes 110 and 130, and the first and second touch sensor pads 152 and 154, and are arranged independently, but may be included in a configuration which enhances the reliability of touch sensing/driving.

The blocking pad 151 may be disposed between the first touch sensor pad 152 and the second touch sensor pad 154 adjacent to each other. For example, a plurality of first touch sensor pads 152 may be arranged in the row direction to form a first touch pad row, and a plurality of second touch sensor pads 154 may be arranged in the row direction to form a second touch pad row. The blocking pad 151 may be inserted between the first touch pad row and the second touch pad row.

The independence of current and signal in the sensing channel row and the sensing channel column is enhanced by the blocking pad 151, and mutual interference between a drive current and a receiving current may be prevented.

The guard pad 153 may be disposed at an end of the pad row arranged in the bonding area BA. For example, the guard pad 153 may be the outermost pad included in the pad row.

In some embodiments, the guard pads 153 may be disposed at both ends of the pad row.

According to exemplary embodiments, a blocking line 141 and a guard line 143 may be connected to blocking pads 151 and the guard pads 153, respectively. The blocking line 141 and the guard line 143 may extend from the blocking pads 151 and the guard pads 153, respectively, within the peripheral area PA.

As shown in FIG. 1, an area where the first traces 142 extend in the row direction and an area where second traces 144 extend in the row direction may be divided by the blocking line 141. Due to the blocking line 141, signal collisions between the first traces 142 and the second traces 144 may be prevented, and mutual interference between the drive current and the receiving current may be prevented.

The guard line 143 may extend to at least partially surround the active area AA. For example, the guard line 143 may extend continuously between the guard pads 153 disposed at both ends of the pad row to form a loop. Accordingly, mutual interference between a touch signal and an external noise in the active area AA may be reduced/blocked overall.

The antenna unit 200 may include a radiator 210 ground lines 230 a transmission line 220.

For example, the radiator 210 may have a polygonal plate shape.

For example, the transmission line 220 may have a width smaller than that of the radiator 210 and may be connected with one end or one side of the radiator 210. The radiator 210 and the transmission line 220 may be formed as a single member integrally connected with each other.

A target resonance frequency of the antenna unit 200 may be adjusted depending on the shape/size of the radiator 210. For example, the radiator 210 may be designed to radiate radio waves in a high frequency/ultra-high frequency band of 3G, 4G, 5G or higher. For example, a radiation band of a frequency band of about 0.5 GHz or higher, about 1 GHz or higher, about 10 GHz or higher, about 20 GHz or higher, about 30 GHz or higher, or about 40 GHz or higher may be implemented through the radiator 210.

Antenna pads 250 may be arranged together with the touch sensor pads 150 within the bonding area BA. Antenna power supply/driving signals for the antenna units 200 may be transmitted from the antenna pads 250 to the transmission lines 220.

In some embodiments, the transmission line 220 may have a variable width. As illustrated in FIG. 1, the transmission line 220 may include an extended line part 225 whose width is increased at an end adjacent to the radiator 210. The extension line part 225 may suppress signal loss transmitted from the antenna pad 250 to the radiator 210 and facilitate impedance matching with the radiator 210.

The transmission lines 220 have a bent line shape, respectively, thereby allowing the antenna pads 250 to be efficiently collected within the bonding area BA. For example, the transmission lines 220 may include two bent portions, respectively.

In some embodiments, all the lengths of the transmission lines 220 of the antenna units 200 may be substantially the same. In this case, it is possible to make signal phases applied to the respective antenna units 200 be uniform. Accordingly, radiation of a desired frequency band may be implemented with high reliability while suppressing the phase interference.

According to exemplary embodiments, the touch sensor pads 150 and the antenna pads 250 may form a single pad row at one end of the sensor device. The single pad row may further include the blocking pad 151 and the guard pad 153.

The sensing electrodes 110 and 130, the traces 140 and/or the antenna unit 200 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn) or an alloy containing at least one of these. These may be used alone or in combination of two or more.

In one embodiment, the sensing electrodes 110 and 130, the traces 140 and/or the antenna unit 200 may include silver (Ag) or a silver alloy (e.g., a silver-palladium-copper (APC) alloy), or copper (Cu) or a copper alloy (e.g., a copper-calcium (CuCa) alloy) for implementation of low resistance and fine linewidth.

In some embodiments, the sensing electrodes 110 and 130, the traces 140, and/or the antenna unit 200 may include a transparent conductive oxide, such as indium tin oxide (ITO), indium zinc oxide (IZO), indium zinc tin oxide (IZTO), or zinc oxide (ZnOx).

In some embodiments, the sensing electrodes 110 and 130, the traces 140, and/or the antenna unit 200 may include a lamination structure of a transparent conductive oxide layer and a metal layer, for example, a two-layer structure of a transparent conductive oxide layer-metal layer or a three-layer structure of a transparent conductive oxide layer-metal layer-transparent conductive oxide layer. In this case, the flexible characteristic may be enhanced by the metal layer, and the signal transmission speed may be improved by reducing the resistance, as well as the corrosion resistance and transparency may be improved by the transparent conductive oxide layer.

The sensing electrodes 110 and 130, the traces 140 and/or the antenna unit 200 may include a blackening treated part. Accordingly, the reflectivity on the surface of the sensing electrodes 110 and 130, the traces 140 and/or the antenna unit 200 may be reduced, thereby decreasing pattern visibility due to light reflection.

In one embodiment, the surfaces of the metal layer included in the sensing electrodes 110 and 130, the traces 140 and/or the antenna unit 200 may be converted into a metal oxide or metal sulfide to form a blackening layer. In one embodiment, blackening layer(s) such as a black material coating layer or a plating layer may be formed on the sensing electrodes 110 and 130, the traces 140 and/or the antenna unit 200 or the metal layer. The black material or plating layer may include an oxide, sulfide, alloy, or the like containing silicon, carbon, copper, molybdenum, tin, chromium, molybdenum, nickel, cobalt, or at least one of these.

The composition and thickness of the blackening layer may be adjusted considering the reflectivity reduction effect and antenna radiation characteristics.

In one embodiment, the sensing electrodes 110 and 130 and the radiator 210 may include a mesh structure. Accordingly, it is possible to suppress the sensing electrodes 110 and 130 and the radiator 210 from being viewed by a user in the active area AA.

In one embodiment, at least a portion of the transmission line 220 may include a solid structure formed of the above-described metal or alloy. Accordingly, an increase in the resistance between the antenna unit 200 and the antenna pad 250 may be suppressed, and the power supply efficiency may be improved.

The antenna unit 200 is disposed in the active area AA, and may be partially disposed in the peripheral area PA. For example, the transmission line 220 may be disposed in the peripheral area PA. In one embodiment, the transmission line 220 may extend across the active area AA and the peripheral area PA.

In one embodiment, the transmission line 220 may also share the mesh structure. The transmission line 220 may also have a partially solid structure.

In one embodiment, the sensing electrodes 110 and 130 and/or the radiator 210 may include a solid thin film transparent metal structure. Accordingly, the sensing sensitivity and emission performance may be further improved.

The touch sensor pads 150 and the antenna pads 250 may have a solid structure formed of the above-described metal or alloy. Accordingly, the bonding resistance with the circuit board 300 may be reduced.

In exemplary embodiments, the sensing electrodes 110 and 130 and the antenna unit 200 may be disposed in the same layer or at the same level. For example, the sensing electrodes 110 and 130 and the radiator 210 may be formed together in the same layer through the same patterning process to have a mesh structure.

In some embodiments, the antenna unit 200 and the traces 140 may be formed in the same layer or at the same level.

According to exemplary embodiments, the touch sensor pads 150 and the antenna pads 250 may be arranged together in the same layer or at the same level. Accordingly, antenna bonding and touch sensor bonding may be implemented together through one circuit board 300 as described below.

In some embodiments, the antenna unit 200 and the antenna pad 250 may be directly connected with each other in the same layer. Accordingly, antenna signal loss may be suppressed while reducing antenna power supply resistance.

In some embodiments, the sensing electrodes 110 and 130, the traces 140 and the touch sensor pads 150 may be directly connected with each other in the same layer. This may enhance the touch sensing sensitivity while reducing the sensing channel resistance.

As shown in FIG. 1, a plurality of antenna units 200 may be arranged in the form of array at one end adjacent to the bonding area BA of the active area AA.

The sensing electrodes 110 and 130 adjacent to the radiator 210 of the antenna unit 200 may have a reduced area compared to the other sensing electrodes 110 and 130. Accordingly, an arrangement space of the antenna unit 200 may be secured while maintaining the mutual independence of touch sensing and antenna radiation. For example, the sensing electrodes 110 and 130 adjacent to the radiator 210 may include a recess etched so that the radiator 210 is partially inserted.

In some embodiments, the touch sensor pad 150 (e.g., the first touch sensor pad 152) may be disposed between the adjacent antenna pads 250. For example, a plurality of antenna pad units may be arranged repeatedly in the row direction with the touch sensor pad 150 interposed therebetween.

In some embodiments, antenna ground pads (not shown) may be further arranged around the antenna pad 250. Due to the antenna ground pad, mutual independence and reliability of antenna power supply/radiation through the antenna ground pad and touch sensing through the sensing electrodes 110 and 130 may be improved.

In some embodiments, a plurality of touch sensor pads 150 may be disposed between the adjacent antenna pads 250. For example, a plurality of first touch sensor pads 152 may be disposed between the adjacent antenna pads 250. In this case, a plurality of first traces 142 may be disposed between the adjacent antenna units 200.

In some embodiments, one touch sensor pad 150 may be disposed between the adjacent antenna pads 250. For example, one first touch sensor pad 152 may be disposed between the adjacent antenna pad units. Accordingly, a pad density in the pad row may be increased, while decreasing the number of touch sensor pads 150 sandwiched between the antenna pad units.

Figure 3:
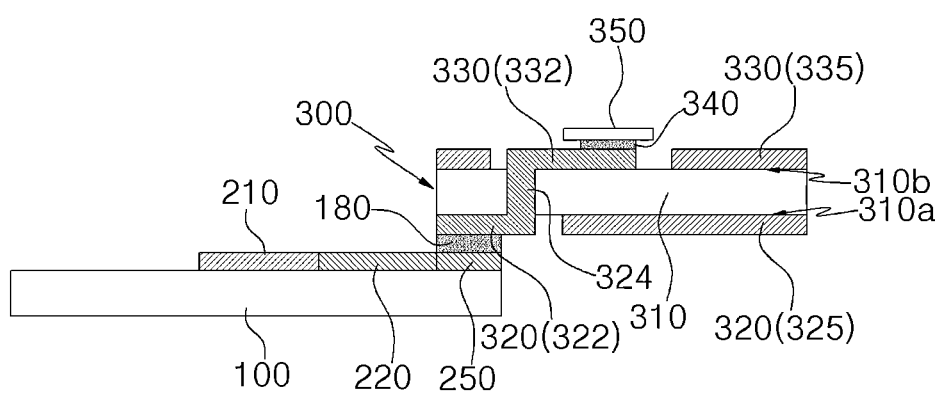
FIGS. 3 and 4 are schematic cross-sectional views illustrating a sensor device package according to exemplary embodiments.
Figure 4:
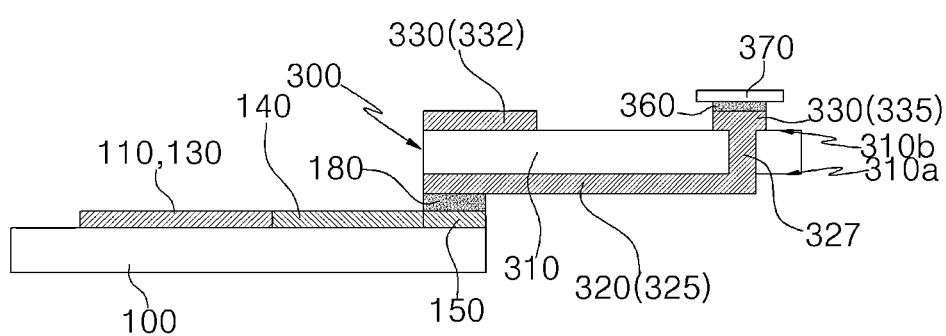
Figure 5:
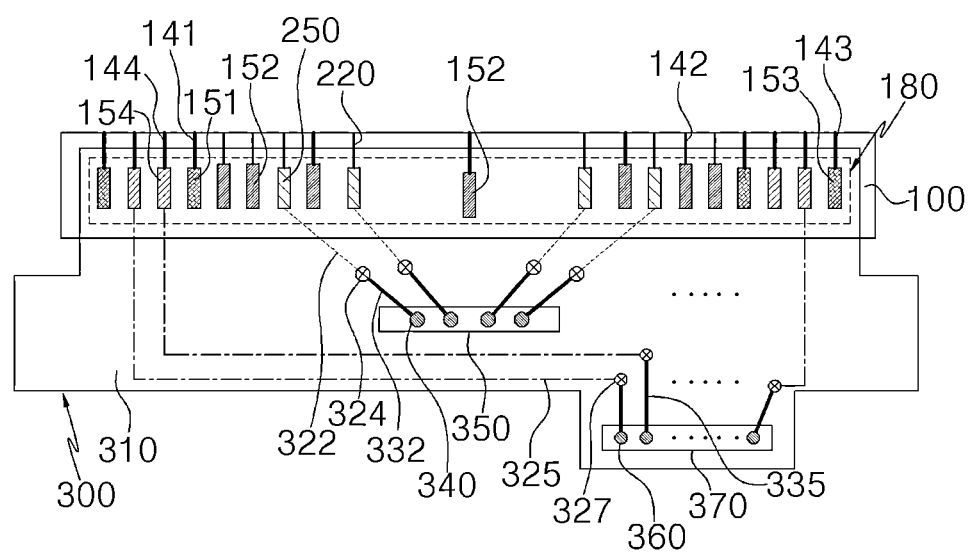
FIG. 5 is a schematic partially enlarged plan view illustrating the sensor device package according to exemplary embodiments.

FIGS. 3 and 4 are schematic cross-sectional views illustrating a sensor device package according to exemplary embodiments. FIG. 5 is a schematic partially enlarged plan view illustrating the sensor device package according to exemplary embodiments. FIG. 5 is a plan view illustrating an enlarged structure around the bonding area of the sensor device.

FIG. 3 illustrates a connection of the antenna pad 250 with the antenna unit 200 through the circuit board 300. FIG. 4 illustrates a connection of the touch sensor pad 150 with the sensing electrodes 110 and 130 of the touch sensor through the circuit board 300. For the convenience of description, the sensor device package is shown by separating in FIGS. 3 and 4. However, as shown in FIG. 5, one circuit board 300 and one sensor device may be coupled to implement a single sensor device package.

Referring to FIGS. 3 to 5, the circuit board 300 may include a core layer 310, a first conductive layer 320 and a second conductive layer 330.

The core layer 310 may include a flexible resin such as a polyimide resin, a modified polyimide (MPI), an epoxy resin, a polyester, a cycloolefin polymer (COP), a liquid crystal polymer (LCP) or the like. In a preferred embodiment, the core layer 310 may include the polyimide resin or MPI.

The conductive layers 320 and 330 of the circuit board 300 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), tin (Sn), zinc (Zn), molybdenum (Mo), calcium (Ca), or an alloy containing at least one of these metals. In some embodiments, the conductive layers 320 and 330 may include copper or a copper alloy in consideration of signal efficiency and ground efficiency.

In one embodiment, the circuit board 300 may be made from a copper clad laminate (CCL). The circuit board 300 may be provided as a flexible printed circuit board (FPCB).

The core layer 310 may have a first surface 310a and a second surface 310b which face each other. For example, the first surface 310a and the second surface 310b may correspond to a lower surface and an upper surface of the core layer 310, respectively. According to exemplary embodiments, the first surface 310a may correspond to a bonding surface to the sensor device, and the second surface 310b may correspond to a mounting surface of a driving circuit/driving circuit connection structure.

The first conductive layer 320 and the second conductive layer 330 may be formed on the first surface 310a and the second surface 310b of the core layer 310, respectively.

The first conductive layer 320 may include a first antenna signal line 322 and a first touch sensor signal line 325. The second conductive layer 330 may include a second antenna signal line 332 and a second touch sensor signal line 335.

The first antenna signal line 322 and the first touch sensor signal line 325 may be distributed together at the same level on the first surface 310a of the core layer 310. The second antenna signal line 332 and the second touch sensor signal line 335 may be distributed together at the same level on the second surface 310b of the core layer 310.

As illustrated in FIG. 3, the first antenna signal line 322 may be electrically connected to the antenna pad 250 by a bonding intermediary structure 180. According to exemplary embodiments, the bonding intermediary structure 180 may include an anisotropic conductive film (ACF).

As illustrated in FIG. 1, the plurality of antenna units 200 may be arranged in an array form. In this case, a plurality of first antenna signal lines 322 may be individually bonded or connected to the antenna pads 250 to correspond to each of the antenna units.

The second antenna signal line 332 may be electrically connected to the first antenna signal line 322 on the second surface 310b of the core layer 310. For example, a plurality of second antenna signal lines 332 may be arranged on the second surface 310b of the core layer 310 to correspond to each of the plurality of first antenna signal lines 322.

According to exemplary embodiments, the first antenna signal line 322 and the second antenna signal line 332 may be electrically connected to each other through an antenna via structure 324. The antenna via structure 324 may penetrate the core layer 310 to connect the first antenna signal line 322 and the second antenna signal line 332.

For example, the antenna via structure 324 may be formed by forming an antenna via hole to penetrate the core layer 310, and filling the antenna via hole through plating (e.g., copper plating) process. The antenna via structure 324 may be formed as a conductor substantially integral with the first antenna signal line 322 and the second antenna signal line 332.

The second antenna signal line 332 may be electrically connected with an antenna driving circuit/antenna connection structure 350. In one embodiment, the antenna driving circuit/antenna connection structure 350 may include an antenna connector. The antenna connector may be, for example, a board-to-board (B2B) connector. In this case, the circuit board 300 may be coupled to a chip mounting substrate through the antenna connector.

For example, the antenna driving circuit/antenna connection structure 350 may include an antenna driving integrated circuit (IC) chip. In this case, an antenna driving IC chip 350b (see FIG. 9) may be directly mounted on the circuit board 300 through the antenna conductive intermediary structure 340. The antenna conductive intermediary structure 340 may include a solder, a conductive ball, a conductive wire and the like.

As illustrated in FIG. 4, the first touch sensor signal line 325 may be bonded to the touch sensor pad 150 to be electrically connected thereto by the above-described bonding intermediary structure 180.

A plurality of first touch sensor signal lines 325 may be individually bonded or connected to the touch sensor pads 150 to correspond to each of the traces 140.

The second touch sensor signal line 335 may be electrically connected with the first touch sensor signal line 325 on the second surface 310b of the core layer 310. For example, a plurality of second touch sensor signal lines 335 may be arranged on the second surface 310b of the core layer 310 to correspond to each of the first touch sensor signal lines 325.

According to exemplary embodiments, the first touch sensor signal line 325 and the second touch sensor signal line 335 may be electrically connected to each other through a touch sensor via structure 327. The touch sensor via structure 327 may penetrate the core layer 310 to connect the first touch sensor signal line 325 and the second touch sensor signal line 335.

For example, the touch sensor via structure 327 may be formed by forming a touch sensor via hole to penetrate the core layer 310, and filling the touch sensor via hole through the plating (e.g., copper plating) process. The touch sensor via structure 327 may be formed as a conductor substantially integral with the first touch sensor signal line 325 and the second touch sensor signal line 335.

The second touch sensor signal line 335 may be electrically connected with the touch sensor driving circuit/touch sensor connection structure 370. In one embodiment, the touch sensor drive circuit/touch sensor connection structure 370 may include a touch sensor connector. The touch sensor connector may be, for example, a board-to-board (B2B) connector. In this case, the circuit board 300 may be coupled to the chip mounting board through the touch sensor connector.

For example, the touch sensor driving circuit/touch sensor connection structure 370 may include a touch sensor driving integrated circuit (IC) chip. In this case, the touch sensor driving IC chip 370b may be directly mounted on the circuit board 300 through a touch sensor conductive intermediary structure 360. The touch sensor conductive intermediary structure 360 may include a solder, a conductive ball, a conductive wire and the like.

According to the above-described exemplary embodiments, the touch sensor pads 150 and the antenna pads 250 may be arranged together in the bonding area BA of the sensor device, such that power supply/signal transmission of the antenna and the touch sensor may be performed together through one circuit board 300.

The circuit board 300 is formed as a multilayer conductive structure including the first conductive layer 320 and the second conductive layer 330, and the first conductive layer 320 and the second conductive layer 330 may be designed to include an antenna signal line and a touch signal line, respectively. Through the antenna via structure 324 and the touch sensor via structure 327 which connect the first conductive layer 320 and the second conductive layer 330 with each other, the power supply reliability and power supply efficiency to the antenna pad 250 and the touch sensor pad 150 may be improved using the single circuit board 300.

In some embodiments, a reference potential or ground potential may be applied to the blocking pad 151 and/or the guard pad 153. For example, a touch drive signal potential may be applied to the touch sensor pads 152 and 154 through the touch sensor drive IC chip 370b (see FIG. 9), and the reference potential or ground potential may be applied to the blocking pad 151 and/or the guard pad 153.

The reference potential or ground potential may be lower than each of a potential of the touch drive signal to the touch sensor pad 150 and a power supply potential to the signal pad 252. In one embodiment, the reference potential or ground potential may be substantially 0 V.

In some embodiments, the touch sensor signal lines 325 and 335 may further include signal lines which are connected to the blocking pad 151 and/or the guard pad 153 to apply the reference potential or ground potential thereto.

In some embodiments, the reference potential or ground potential may be applied to the antenna ground pad (not shown).

Mutual independence of the antenna power supply/driving signals and the touch sensing signals may be enhanced through the above-described reference potential/ground potential.

Figure 6:
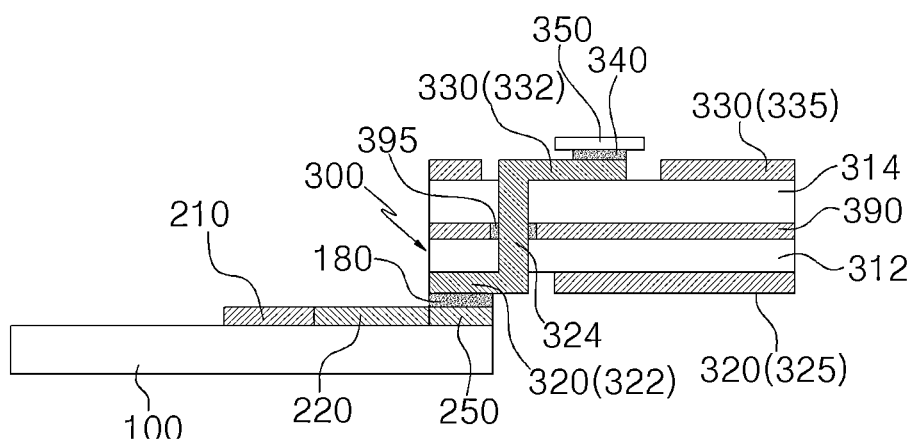
FIGS. 6 and 7 are schematic cross-sectional views illustrating the sensor device package according to exemplary embodiments.
Figure 7:
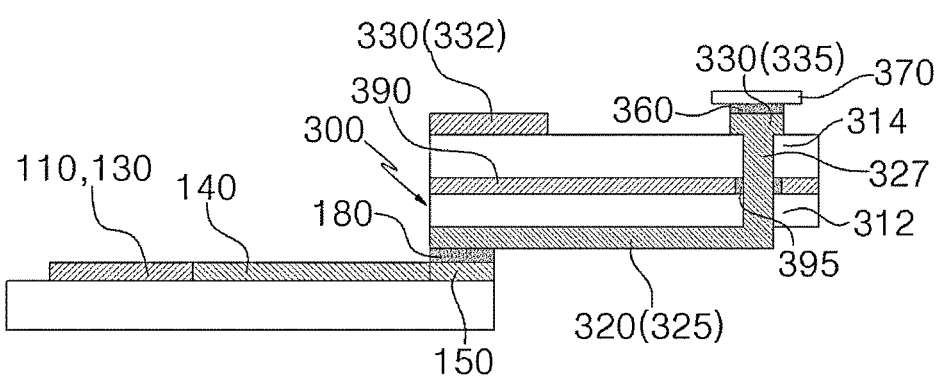

FIGS. 6 and 7 are schematic cross-sectional views illustrating the sensor device package according to exemplary embodiments. Configurations and structures that are substantially the same as or similar to those described with reference to FIGS. 1 to 5 will not be described in detail.

Referring to FIGS. 6 and 7, the circuit board 300 may further include a mid-ground layer 390 disposed between the first conductive layer 320 and the second conductive layer 330. In this case, the circuit board 300 may have a conductive layer structure of three or more layers.

The core layer 310 may be provided in the form of a plurality of interlayer insulation layers. According to exemplary embodiments, a first interlayer insulation layer 312 may be disposed between the first conductive layer 320 and the mid-ground layer 390, and a second interlayer insulation layer 314 may be disposed between the mid-ground layer 390 and the second conductive layer 330.

The mid-ground layer 390 may be electrically and physically separated from the antenna via structure 324 and the touch sensor via structure 327. In one embodiment, the mid-ground layer 390 may include holes through which the antenna via structure 324 and the touch sensor via structure 327 penetrate, respectively.

In one embodiment, a blocking insulation layer 395 may be formed between the mid-ground layer 390 and the via structures 324 and 327. Accordingly, insulating separation between the mid-ground layer 390 and the via structures 324 and 327 may be stably maintained.

The independence and efficiency of each of the antenna signal transmission and the touch sensor signal transmission through the first conductive layer 320 and the second conductive layer 330 may be increased by the mid-ground layer 390, and the overall signal/power loss may be reduced.

Figure 8:
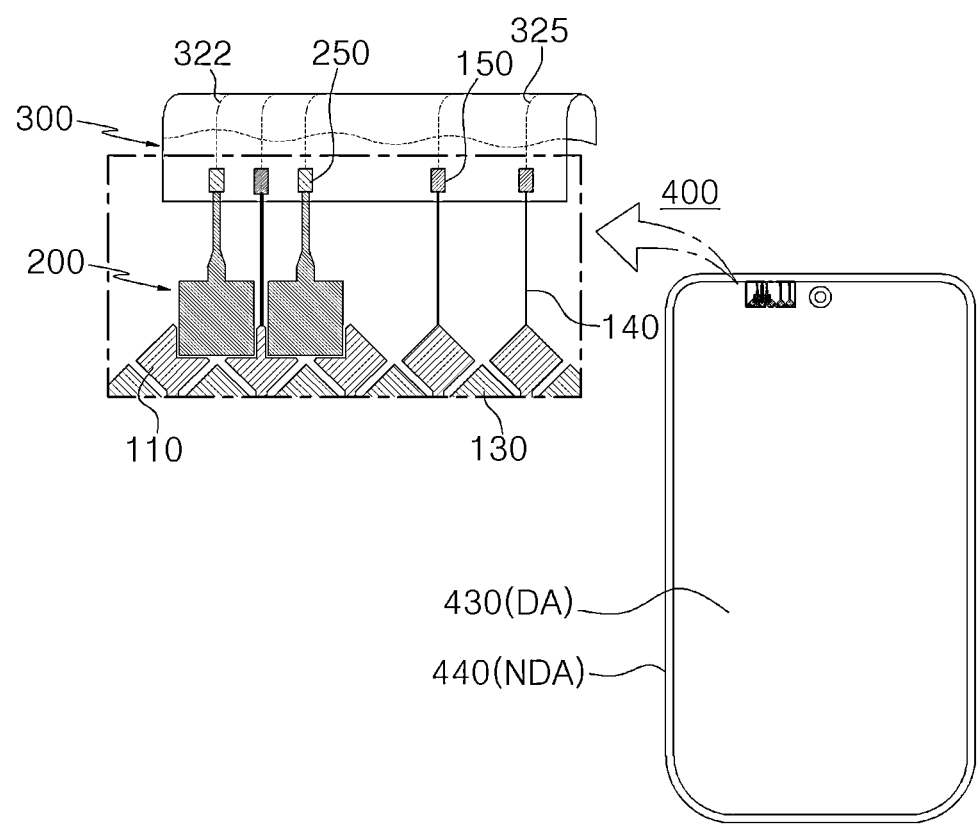
FIGS. 8 and 9 are a schematic plan view and a cross-sectional view illustrating an image display device according to exemplary embodiments, respectively.
Figure 9:
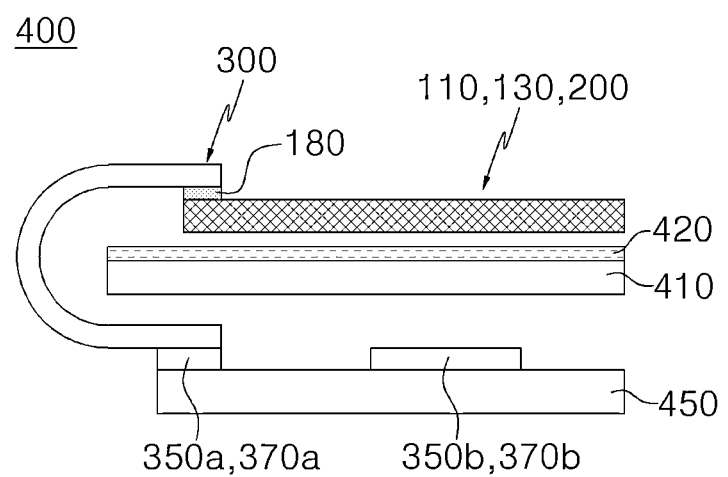

FIGS. 8 and 9 are a schematic plan view and a cross-sectional view illustrating an image display device according to exemplary embodiments, respectively.

FIG. 8 illustrates a front portion or a window surface of an image display device 400 manufactured in the form of, for example, a smart phone. The front surface of the image display device 400 may include a display area (DA) 430 and a non-display area (NDA) 440. The non-display area 440 may correspond to, for example, a light-shielding part or a bezel part of the image display device 400.

Referring to FIGS. 8 and 9, the image display device 400 may include a display panel 410 and the above-described sensor device disposed on the display panel 410.

The sensor device according to the above-described exemplary embodiments may be disposed toward the front portion of the image display device 400, and for example, may be disposed on the display panel. Accordingly, the antenna units 200 included in the sensor device may be provided as an antenna-on-display (AOD) antenna.

In some embodiments, the sensor device may be attached to the display panel in the form of a film. In some embodiments, the sensor device may be disposed across the display area 430 and the non-display area 440 of the image display device 400.

In some embodiments, the active area AA of the sensor device may be overlapped with the display area 430. In one embodiment, the sensing electrodes 110 and 130 and/or the radiator 210 may be at least partially overlapped with the display area 430.

In some embodiments, the peripheral area PA of the sensor device may be overlapped with the non-display area 440. The traces 140 and/or the signal pads 230 of the antenna unit 200 may be at least partially overlapped with the non-display area 440. For example, a portion having a solid structure of the sensor device may be overlapped with the non-display area 440.

The sensor device may be powered or driven through the circuit board 300. As described with reference to FIGS. 3 and 4, the circuit board 300 is electrically connected with the antenna driving circuit/antenna connection structure 350. The antenna driving circuit/antenna connection structure 350 may include an antenna connector 350*a* and an antenna driving IC chip 350*b*. The touch sensor driving circuit/touch sensor connection structure 370 may include a touch sensor connector 370*a* and a touch sensor driving IC chip 370*b*.

For the convenience of illustration, the antenna connector 350*a* and the touch sensor connector 370*a* are shown as one connector in FIG. 9. However, as described above, the antenna connector 350*a* and the touch sensor connector 370*a* may be mounted as independent, separate members on the circuit board 300. The antenna driving IC chip 350*b* and the touch sensor driving IC chip 370*b* may also be mounted as independent, separate chips on a chip mounting board 450.

The circuit board 300 may be bent to the back portion of the image display device 400 to be connected with the driving IC chips 350*b* and 370*b* mounted on the chip mounting board 450.

For example, the antenna unit 200 and the circuit board 300 may be electrically connected with the antenna driving IC chip 350*b* through the antenna connector 350*a*. The sensing electrodes 110 and 130 of the touch sensor and the circuit board 300 may be electrically connected with the touch sensor driving IC chip 370*b* through the touch sensor connector 370*a*.

The chip mounting board 450 may be a rigid printed circuit board, and for example, may be a main board of the image display device 400.

As described with reference to FIGS. 3 and 4, the antenna driving IC chip 350*b* and the touch sensor driving IC chip 370*b* may be directly mounted on the circuit board 300.

According to exemplary embodiments, the display panel 410 may further include an optical layer 420 disposed thereon. For example, the optical layer 420 may be a polarizing layer including a polarizer or a polarizing plate. In some embodiments, the sensor device may be disposed on the optical layer 420.

What is claimed is:

1. A sensor device package comprising:
   a sensor device including touch sensing electrodes and an antenna unit; and
   a circuit board bonded to the sensor device, the circuit board comprising:
      a core layer comprising a first surface and a second surface which face each other;
      a first conductive layer comprising first touch sensor signal lines and a first antenna signal line which are distributed at the same level on the first surface of the core layer;
      a second conductive layer comprising second touch sensor signal lines and a second antenna signal line which are distributed at the same level on the second surface of the core layer;
      an antenna via structure which penetrates the core layer to connect the first antenna signal line and the second antenna signal line with each other; and
      a touch sensor via structure penetrating the core layer to connect each of the first touch sensor signal lines and the second touch sensor signal lines with each other.

2. The sensor device package according to claim 1, wherein the sensor device further comprises touch sensor pads electrically connected with the touch sensing electrodes and an antenna pad electrically connected with the antenna unit;
   the first touch sensor signal lines of the circuit board are bonded to the touch sensor pads respectively; and
   the first antenna signal line of the circuit board is bonded to the antenna pad.

3. The sensor device package according to claim 2, wherein the touch sensor pads and the antenna pad are arranged at one end of the sensor device to form a single pad row.

4. The sensor device package according to claim 3, wherein the sensor device further comprises a blocking pad which is included in the single pad row and inserted between adjacent touch sensor pads of the touch sensor pads, or a guard pad disposed at an end of the single pad row.

5. The sensor device package according to claim 4, wherein the sensor device further comprises: traces which connect the touch sensing electrodes and the touch sensor pads with each other; and
   a blocking line which extends from the blocking pad between adjacent traces of the traces.

6. The sensor device package according to claim 4, wherein the sensor device further comprises a guard line of a loop shape, which extends from the guard pad and surrounds the touch sensing electrodes.

7. The sensor device package according to claim 3, further comprising one anisotropic conductive film which bonds the single pad row and the first conductive layer of the circuit board.

8. The sensor device package according to claim 2, wherein the antenna unit comprises a radiator and a transmission line which extends from the radiator to be connected to the antenna pad.

9. The sensor device package according to claim 8, wherein a plurality of antenna units are arranged in a row direction, and the antenna pads are independently connected to each of the antenna units.

10. The sensor device package according to claim 9, wherein the transmission lines connected to each of the plurality of antenna units have a bent line shape and have the same length.

11. The sensor device package according to claim 9, wherein at least one touch sensor pad of the touch sensor pads is arranged between the antenna pads connected to adjacent antenna units of the antenna units.

12. The sensor device package according to claim 1, further comprising:
   a touch sensor driving circuit/touch sensor connection structure electrically connected with the second touch sensor signal lines on the second surface of the core layer; and
   an antenna driving circuit/antenna connection structure electrically connected with the second antenna signal line on the second surface of the core layer.

13. The sensor device package according to claim 12, wherein the antenna driving circuit/antenna connection structure comprises an antenna driving integrated circuit chip or an antenna connector, and
   the touch sensor driving circuit/touch sensor connection structure comprises a touch sensor driving integrated circuit chip or a touch sensor connector.

14. The sensor device package according to claim 1, wherein the circuit board further comprises a mid-ground layer disposed between the first conductive layer and the second conductive layer in the core layer.

15. The sensor device package according to claim 14, wherein the antenna via structure and the touch sensor via structure are electrically separated from the mid-ground layer and penetrate the mid-ground layer.

16. The sensor device package according to claim 1, wherein the sensor device further comprises a substrate layer,
   wherein the touch sensing electrodes and the antenna unit are arranged together at the same level on the upper surface of the substrate layer.

17. The sensor device package according to claim 16, wherein the substrate layer comprises an active area where the touch sensing electrodes are distributed and a peripheral area surrounding the active area,
   wherein the antenna unit is partially disposed on the active area.

18. An image display device comprising:
   a display panel; and
   the sensor device package according to claim 1.

* * * * *